Patented Apr. 20, 1943

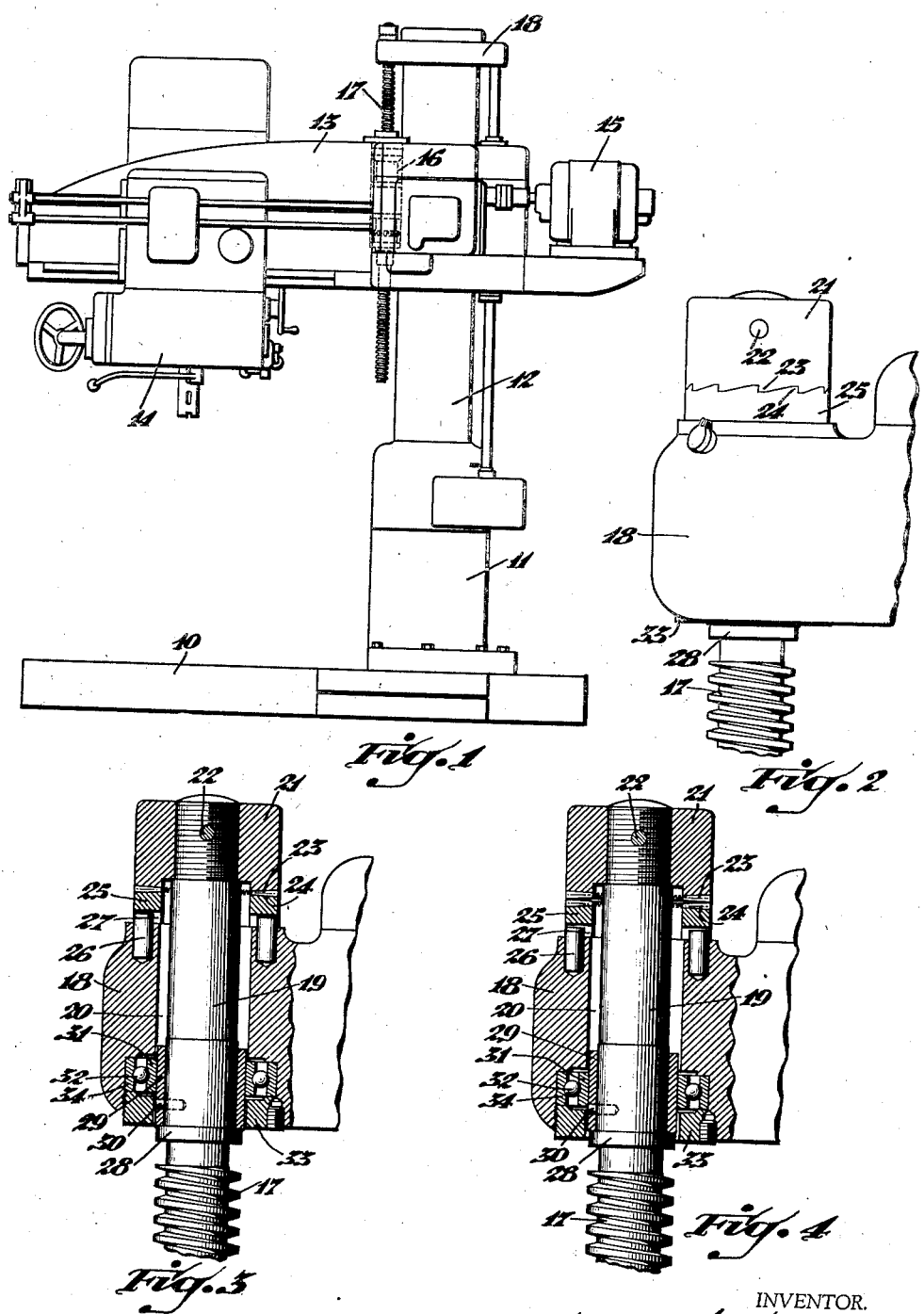

2,317,060

UNITED STATES PATENT OFFICE 2,317,060

SAFETY DEVICE FOR RADIAL DRILL ARM ELEVATING SCREWS

William G. Hoelscher, Cincinnati, Ohio, assignor to The American Tool Works Company, Cincinnati, Ohio, a corporation of Ohio Application April 29, 1942, Serial No. 440,954

8 Claims. (Cl. 77—28)

This invention relates to machine tools and is particularly directed to improvements in the mounting and structure of the elevating screw for a radial drill. In the type of radial drill concerned in this invention, the arm of the drill is raised and lowered on the column by means of a power driven nut mounted within the arm and engaging the threads of a vertically suspended elevating screw. The screw is normally stationary.

A great many patents have been issued directed to safety means which will prevent further downward movement of the arm in the event that the arm strikes an obstruction. A device of this sort has consisted of a structural arrangement which might be termed as an automatic clutch or slip device and which disconnected the stationary screw from its stationary relationship with respect to the cap, and permitted it to rotate with the nut. In other words, as the arm engaged an obstruction, axial upward movement was imparted to the screw moving the clutching elements apart and breaking the fixed connection of the elevating screw, whereupon it rotated with the nut due to the friction between them as imposed by the load.

Now, the present inventor has discovered that a very serious fault exists in this arrangement. In the past, the plain upper end of the elevating screw was mounted within a plain bore and would slide axially in this bore to break the coupling when the arm struck an obstruction. However, in some cases, it occurred that the elevating screw was not rotatively freed; that is, it was still held by frictional engagement within the bore as brought about by springing or whip of the elevating screw, imperfect fit, or due to the accumulation of dirt. It has been possible for the screw to cling to the cap.

When this happened, the screw moved rapidly upwardly axially, considerably beyond the short distance required to break the coupling between the clutch elements. The arm being fully supported upon the obstruction, the rotation of the nut brought about this rapid upward axial movement. By this time, the elevating screw traversed the cap for a considerable distance and the upper clutch element was disposed high above the other clutch element upon which it normally rests.

The operator would not notice this condition, but having noticed the obstruction, he would reverse the elevating nut or would remove the obstruction, whereupon the arm would drop down under its own extremely heavy weight. Now, these arms weigh a great deal and when this happened, the cap was usually broken off and the arm fell all the way down the column, doing great damage to the mechanisms and possibly badly injuring the operator if he happened to be in the way.

Accordingly, it has been an object of the present inventor to provide a structural arrangement of the elevating screw and mounting therefor in the cap which will prevent the elevating screw from clinging to the cap. That is to say, the elevating screw is definitely rotatably freed if the clutch elements are separated by a slight upward movement of the elevating screw.

Thus, the improvement resides in the mounting of the plain upper end of the elevating screw in the cap in such manner that there is no opportunity for a frictional bind to occur. This has been accomplished by an arrangement of bearings and by adequate clearances wherein the elevating screw may move axially within the bearings and be frictionally freed when the clutch connection of the slip device is broken.

Other objects and certain advantages will be more fully apparent from the following description of the drawing in which:

Figure 1 is a general view looking toward the rear of a radial drill incorporating the elevating screw mounting of this invention.

Figure 2 is a fragmentary enlarged view of the portion of the cap from which the elevating screw is suspended.

Figure 3 is a view taken similarly to Figure 2 with a portion of the view shown in section taken diametrically through the elevating screw for illustrating the details of the mounting thereof.

Figure 4 is a view taken similarly to Figure 3, but showing the elevating screw raised to break the connection to the cap and thereby to release the elevating screw from stationary position.

Referring to the general view, a conventional radial drill is shown. The machine consists of a base 10, a stump 11, a column 12 rotatably mounted on the stump, and an arm 13 vertically adjustable on the column. The arm carries the usual drill head 14 slidable along the horizontal ways of the arm. A motor 15 is mounted on the end of the arm opposite to that carrying the drill head and is adapted to drive the various parts of the machine, among which is the nut 16 rotatably mounted within the arm about the elevating screw 17. Rotation of the nut will raise and lower the arm upon the column by virtue of the engagement of the nut with the threads of the stationary elevating screw. The elevating screw is suspended from the cap 18 fixed upon the upper end of the column.

For this purpose, the elevating screw includes a plain portion 19 extending upwardly through a vertical bore 20 in the cap. The upper end of the elevating screw has a supporting collar 21 pinned thereon by means of a pin 22. This collar is screwed upon a screwthreaded counter-turned portion of the elevating screw. The collar is not only effective for suspending the elevating screw, but likewise, for maintaining it against rotation. For this purpose, the downwardly extended, circumferential flange of the collar includes clutch teeth 23 of the saw-tooth type. These engage similar teeth 24 upon the upper surface of a support and clutch element 25, resting upon the top of the cap. Vertically disposed pins 26, extending from within the cap to points above it, engage in radial slots 27 of the clutch element 25 and prevent its rotation.

It has been conventional in the past to provide this slip device for permitting rotation of the elevating screw when downward feed of the arm was blocked. In other words, as the drill head or the arm engaged an obstruction, an axial force was transmitted to the elevating screw, which movement continued until the clutch connection was broken, at which time, the friction between the nut and elevating screw, as brought about by the weight of the arm and other factors, caused unitary rotation of the nut and elevating screw.

In order to prevent, beyond any question, sticking or failure of the normally stationary elevating screw to rotate, the following arrangement is included. A shoulder 28 is provided on the elevating screw just above its screwthreads and directly in line with the bottom of the cap. A bronze bearing sleeve 29 is engaged upon this shoulder from above. The sleeve is engaged about a slightly enlarged counterturned portion of the elevating screw. This sleeve is held in place by means of a pin 30 projecting radially into the elevating screw. The sleeve is slidably mounted within the inner race 31 of a lateral thrust ball bearing unit 32. The outer race 34 of the ball bearing unit is fixed within a counterbored portion of the bore 20 in the cap. A screwthreaded plug 33 is screwed into the counterbored portion of the bore 20 and holds the outer race 34 of the ball bearing against the shoulder of the bore. Apart from the sliding engagement of the sleeve within the inner race of the bearing, full clearance is provided around the elevating screw and around the bronze sleeve.

The sleeve, as stated, is made of bronze. The steel inner race of the bearing is specially hardened and ground so that the bronze sleeve has a sliding fit in the inner race of the bearing, which fit is as nearly perfect as can be provided. Moreover, the engagement of the race and sleeve is relatively short and the axial extent of contact is not sufficient to permit binding if the elevating screw should whip or spring in use. The sleeve is spaced from the bore above and below the race.

Thus, it is impossible for the elevating screw to stick in position, and it will rotate with the nut as soon as it assumes the position shown in Figure 4; that is, with the clutch elements declutched. As stated, if this did not occur; that is, if there were a tendency to bind within the cap, the elevating nut would rotate on the threads of the elevating screw and slide the elevating screw upwardly where its abutment collar would be disposed high above the cap, affording no support for the arm.

Having described my invention, I claim:

1. A mounting for the elevating screw of a radial drill including the elevating screw and the cap mounted on the top of the column of the drill, said mounting comprising a pair of clutch elements consisting of collars, one mounted on the cap and traversed by the screw and the other fixed to the upper end of the screw, said collars including cooperating clutch teeth, the upper end of the elevating screw being plain where it traverses the cap, a lateral thrust ball bearing fixed in the cap about said screw and a sleeve fixed to the screw and slidably traversing the inner race of the bearing, said screw having clearance within the bore of the cap.

2. In a radial drill, a mounting for the elevating screw for an arm of the radial drill including the elevating screw and the cap, said screw supported from the cap and including therewith a clutch means for normally holding the screw stationary, said clutch means disconnected by axial upward movement of the screw and bearing means within the cap surrounding the screw over only a portion of its length contained within the cap, the balance of the elevating screw contained within the cap being considerably spaced from the bore of the cap whereby it cannot contact the bore.

3. In a radial drill construction incorporating a column, an arm vertically adjustable on the column, a cap for the column, an elevating screw suspended from the cap and engaged by a driven nut within the arm, an improved mounting for the elevating screw consisting of a clutch element resting upon and rotatively fixed to the top of the cap, a second clutch element fixed to the upper end of the elevating screw, said cap including a bore traversed by the upper end of the elevating screw and providing substantial clearance for the screw, said clutch elements having cooperating teeth adapted to be separated upon upward axial movement of the elevating screw, a lateral thrust bearing fixed within the bore of the cap toward the lower end thereof, a sleeve fixed on the elevating screw and slidably traversing the inner race of the bearing, whereby the normally stationary elevating screw is always free to rotate when the clutch elements are uncoupled.

4. A mounting for the elevating screw of a radial drill including the elevating screw and the cap mounted on the top of the column of the drill, said mounting comprising a pair of clutch elements consisting of collars, one mounted on the cap and traversed by the screw and the other fixed to the upper end of the screw, said collar including cooperating clutch teeth, and a lateral thrust ball bearing fixed in the cap about said screw, said screw including a portion slidably traversing the inner race of the bearing, said screw having clearance within the bore of the cap apart from the bearing.

5. In a radial drill construction incorporating a column, an arm vertically adjustable on the column, a cap for the column, an elevating screw suspended from the cap and engaged by a driven nut within the arm, an improved mounting for the elevating screw consisting of clutch elements fixed to the upper end of the screw and upon the cap respectively and adapted to be separated upon upward axial movement of the elevating screw, and bearing means within the bore of the cap, said screw slidably traversing the inner race of the bearing, whereby the normally stationary elevating screw is free to rotate when the clutch elements are uncoupled.

6. In a radial drill construction incorporating a column, an arm vertically adjustable on the column, a cap for the column, an elevating screw suspended from the cap and engaged by a driven nut within the arm, an improved mounting for the elevating screw consisting of a clutch element resting upon and rotatively fixed to the top of the cap, a second clutch element fixed to the upper end of the elevating screw, said cap including a bore traversed by the upper end of the elevating screw and providing substantial clearance for the screw, said clutch elements having cooperating teeth adapted to be separated upon upward axial movement of the elevating screw, and a lateral thrust bearing fixed within the bore of the cap, said screw slidably traversing the inner race of the bearing, whereby the normally stationary elevating screw is free to rotate when the clutch elements are uncoupled.

7. In a radial drill, a mounting for the elevating screw for the arm of the radial drill including the elevating screw and the cap, said screw supported from the cap and including therewith a clutch means for normally holding the screw stationary, said clutch means disconnected by axial upward movement of the screw, a lateral thrust ball bearing within the cap surrounding the screw over only a portion of its length contained within the cap, the balance of the elevating screw contained within the cap being considerably spaced from the bore of the cap whereby it cannot contact the bore, and a bronze bearing sleeve fixed on the elevating screw and slidably disposed within the inner race of the ball bearing, said inner race being of hardened steel ground to fit closely to said sleeve.

8. Suspension means for the elevating screw of a radial drill of the type including a column and an arm slidable upon the column with the column including a cap and the arm including a driven nut engaged upon the screw, said suspension means including means relative to the cap for normally holding the elevating screw in position against rotation, said means effective upon axial movement of the elevating screw to permit rotative movement of the elevating screw, said cap including a bore loosely traversed by the upper end of the elevating screw, and bearing means for the upper end of the screw permitting free axial and rotative movement of the elevating screw when the elevating screw is operated to break the connection of the means normally holding it stationary.

WILLIAM G. HOELSCHER.